United States Patent [19]

Rabinowitz

[11] 3,964,534

[45] June 22, 1976

[54] CASTING METHOD WITH A VACUUM BONDED DRY SAND CORE

[75] Inventor: Stephen Rabinowitz, Huntington Woods, Mich.

[73] Assignee: Ford Motor Company, Dearborn, Mich.

[22] Filed: Mar. 4, 1974

[21] Appl. No.: 448,159

[52] U.S. Cl. .................................. 164/7; 164/132; 164/369
[51] Int. Cl.² .................. B22C 15/22; B22D 29/00
[58] Field of Search ............ 164/7; 264/98, DIG. 78

[56] References Cited
UNITED STATES PATENTS

| | | | |
|---|---|---|---|
| 2,517,902 | 8/1950 | Luebkeman | 264/DIG. 78 |
| 3,329,996 | 7/1967 | Marcus et al. | 264/98 X |
| 3,789,907 | 2/1974 | Nakata et al. | 164/7 |

Primary Examiner—Robert D. Baldwin
Attorney, Agent, or Firm—Joseph W. Malleck; Keith L. Zerschling

[57] ABSTRACT

A method for preparing sand cored parts is disclosed which is applicable to certain types of molding techniques where the mold cavity is at least slightly porous, such as shell molding, green sand molding, and most importantly, the cavityless method of molding. An impervious ply of highly formable consumable material, such as polyethylene plastic, is inserted or injected by blow molding to form an envelope conforming to the shape of the core box cavity. Unbonded sand is injected into the interior of the plastic ply to totally fill the same while being vibrated; the plastic envelope is then evacuated of air and sealed off to form a discrete package. The sand core, so packaged, is then removed from the core box and positioned within a molding cavity such as the cavity that might be formed in a consumable foam pattern or assembly whereby the complete cycle of casting may be carried out.

8 Claims, 6 Drawing Figures

CASTING METHOD WITH A VACUUM BONDED DRY SAND CORE

BACKGROUND OF THE INVENTION

Cavityless molding performed with consumable patterns has several distinct advantages, the chief of which is that the shape to be cast may take any configuration. Molding, itself, comprises ramming the sand or other suitable molding material around the pattern without regard to a parting line or pattern draft. This allows for considerable decrease in the cost of molding, particularly for parts where a single casting is required from a given pattern. Typically, the expendable pattern is made from an expanded plastic material such as expanded polystyrene beads or polyethylene, which is, as is well known, porous because it contains air voids in the expanded condition. The material is light weight, economical and easy to form into any desired bulk configuration. The pattern material is capable of being volatilized or burned, particularly in the absence of oxygen without appreciable residue remaining. Accordingly, when the molten metal is poured into the molding box, the pattern is consumed more gradually by the advancing molten metal so that the mold box is never with a void therein and therefore is identified as the cavityless molding method.

This mode of casting has achieved great economic advances when performed with patterns which are unitary or have extremely large openings which can be freely filled with sand during the flask filling operation. That is to say, commercial and repeatable success has been achieved to date only with patterns that, when set within a flask, permit dry unbonded sand to be easily introduced therein or therearound and which will occupy all voids within and without the patterns. However, if the part to be cast requires internal cored parts, the concept of cavityless casting is hampered.

Typically a core for other methods of conventional casting requires a core box into which resin mixed sand is introduced or blown and compacted to form a self-sustaining sand core having green strength sufficient to be transported from the core box to the molding flask for suspension therein. In the case of the cavityless method of molding, such resin bonded sand cores have been prepared in the past by the separate core box method and introduced to the interior of a consumable type pattern which has been split or bifurcated for introduction of the core therein. However, this detracts from one of the principal advantages of the cavityless method which is its use of dry, unbonded sand and the ease with which such sand falls away from the metal casting when metal solidification is complete contributing significantly to reduced finishing costs for the cavityless method. The cost of using separate core boxes, which must be cleared of sand after the core making operation, is undesirable. The requirement for curing of the sand cores with a binder mixed within the sand leading to the non-reuseability of the sand for purposes of the general cavityless method is also undesirable. Furthermore, the green strength of such cured sand cored parts leave much to be desired as to handling strength.

SUMMARY OF THE INVENTION

The principal object of this invention is to provide a method for preparing cored parts made of particulate refractory material which permits the use of dry, unbonded particles and thereby greatly improves core collapsibility, improve the core handling characteristics and green strength, eliminates the necessity for clean-up operations in a conventional core box sequence and reduces the cost of core production commensurate with the cost reduction achieved by the cavityless method of casting.

Particular features pursuant to the above object is the use of (a) introduction of an impervious ply of highly formable continuous material, such as polyethylene plastic having a thickness of about 0.002 inches, the introduction being either by insertion to the heated core box cavity, or by laying throughout the internal surfaces of the heated core box cavity. Unbonded sand is then injected into the interior of such closed bag of material and the injection pressure (with no positive air pressure) acts in combined effect with the thermally induced softening of the plastic film to urge the material to assume the identity of the core box cavity configuration. Sand filling is assisted by simultaneous vibration of the core box to assure complete filling and faithful reproduction of the core box cavity. The sand injection head is then deactivated or removed from the extremity of the bag and a screened vacuum manifold is activated to communicate with the bag interior so that a vacuum may be drawn therein without disturbing the packing arrangement of the sand grains. The vacuum can be maintained while the extremity of the bag is sealed tight by heating of the plastic at the bag opening for providing an air tight seal, or the bag extremity may be sealed immediately and rapidly upon removal of the vacuum-injection head.

DETAILED DESCRIPTION

Cavityless molding is a method whereby a consumable pattern typically formed of polystyrene foam plastic, is coated with a permeable refractory wash and then embedded in foundry sand to be eventually replaced by molten metal. The molten metal vaporizes the foam-type pattern and a metal duplicate of the pattern is the result. The cavityless feature is desirable from the fact that the pattern is not removed from the mold, but rather it is replaced by the molten metal so that the mold is always full of material at any one time. In all other casting processes, a cavity must be provided before the metal can be poured. An important feature of the cavityless method is that unbonded sand can be used which opens up an entirely new field for foundry development. To this date, the cavityless method has shown good results when concerned only with patterns of generally uncored configurations or patterns having relatively large openings so that normal sand filling about the pattern will simultaneously fill the interior faces of the pattern.

Figure 1:
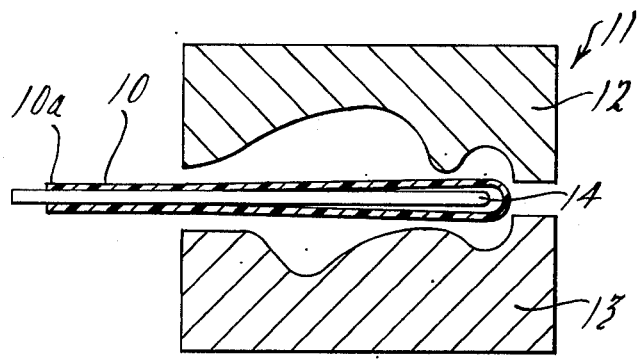
FIGS. 1–3 are schematic illustrations of the essential steps involved in carrying out a preferred sequence of the present invention.
Figure 2:
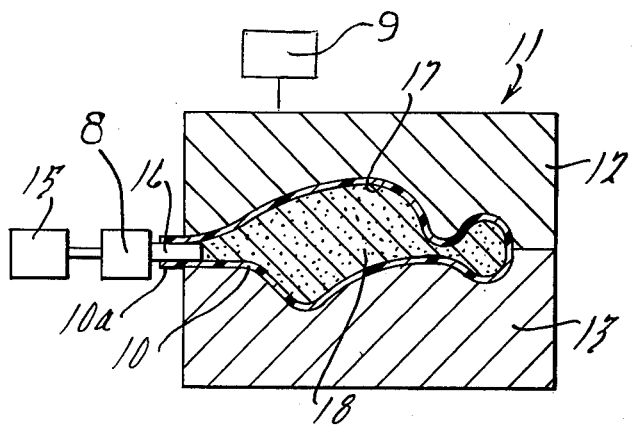
Figure 3:
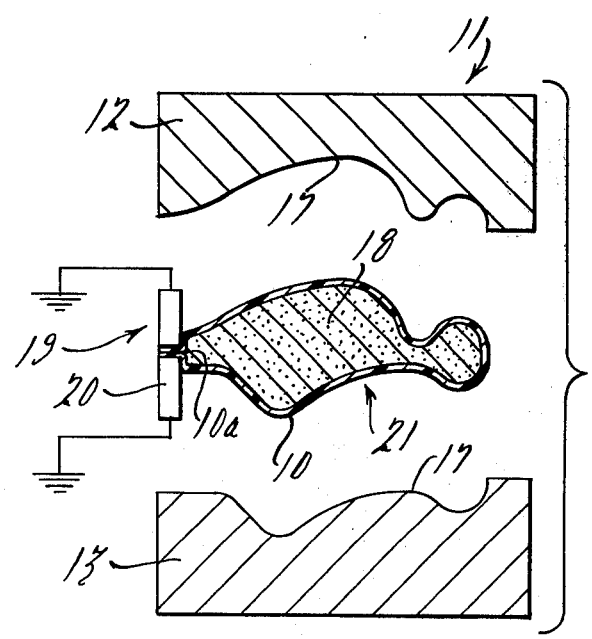

A preferred method for carrying out the present invention is shown in FIGS. 1–3 which will provide a simple, economical method for a core sequence and which retains the important feature of unbonded sand. Such invention has an applicability wider than the cavityless process but will likely find its greatest utility in the cavityless process. The method is essentially three fold. In FIG. 1, a bag-like container or envelope 10 of highly formable, consumable, impermeable plastic material is inserted into a core box 11 (having split portions or permeable core box elements 12 and 13) by way of a mandrel 14 or equivalent means and then the mandrel is withdrawn. The core box 11 has the upper and lower portions separated to permit the introduction of the plastic bag 10 with the mouth 10a of the bag being maintained exterior of the core box when the upper and lower portions are closed. In FIG. 2, the core box is heated by means not shown and a core material of free flowing particulate material, as unbonded sand, is then injected with no positive air pressure by slinger means 8 through a nozzle 16 into the interior of the bag forcing the bag material in conjunction with the effect of the thermally induced softened plastic envelope, to assume the identity of the contours of the core box cavity 17. In certain situations, an additional intermediate step might be required whereby a positive air pressure would be employed to cause the plastic bag to intimately conform to the cavity configuration prior to the introduction of sand particles into said cavity. Sufficient particulate material is injected so that the interior of the bag is totally filled with sand to form a base core 18; the injection is carried out while the core box is vibrated by means 9 having an adequate frequency, amplitude and for a duration to obtain a green strength for the base core when unsupported of at least 400 p.s.i. The envelope 10 thus will form the outer skin for the core assembly. After complete filling, the injection means 8 is deactivated and a vacuum means 15 activated to withdraw air through nozzle 16 while allowing sufficient time for the plastic envelope to reach thermal equilibrium in the core box. The vacuum may be continued while the envelope mouth is sealed, or the vacuum may be interrupted immediately prior to employing a sealing mechanism 19 as shown in FIG. 3. The mechanism 19 may be employed to clamp and/or squeeze the bag mouth at 20 tightly around the sand inserted therein. Plastic fusion heat is imparted by mechanism 19, the latter having a suitable electrical resistance heating coil, so as to soften and fuse the interengaged plys of the envelope clamped by means 19, preferably while the vacuum is maintained. An air-tight seal is achieved by appropriate fusion between the upper and lower plys of the bag at mouth 10a. The next step (not shown) would comprise use of the assembly 21 (base 18 and skin 10) in a fully self-supporting and stabilized condition for convenient handling and insertion in a porous molding cavity or preferably in a consumable-type pattern useful in the cavityless casting method; porous molding cavities may be of the shell mold or green sand type. When molten metal is poured into the mold cavity or flask containing the consumable pattern, which in turn is holding a core assembly prepared according to this invention, the plastic envelope entraining the unbonded core sand therein will be consumed by the heat of molten metal at substantially the same rate and in the same manner as the foam material constituting the consumable pattern.

The starting materials for carrying out such process must be of a particular type to facilitate appropriate core construction. The bag material which will act as a wrapper or skin for the completed core must have the following characteristics: (1) the material must have low permeability such that when completed, air will not penetrate the wrapper or covering over a period of time equivalent to several weeks, (2) the material must be consumable at substantially the same rate as the material forming the consumable pattern for the molding process, if so used in such a process, (3) the material must have a uniform thickness, such as a single ply of conventional polyethylene which will facilitate high flexibility and adherence to the contours of the mold box, (4) the material must be highly formable irrespective of a wide range of thickness and particularly being formable under somewhat elevated temperature conditions, (5) the material must not tear easily during handling conditions after the core construction has been completed, and (6) the material must maintain a certain tension as a skin about the core structure and therefore will not allow a change in volume of the core assembly during the introduction of molten metal therearound so as to leave unequal stress lines on the cast product which may increase the possibility of early fatique failure if the product is used in a dynamic loaded condition.

Particularly effective materials meeting the above criteria in some degree include thermoforming grades of polyethylene or ethylene vinyl acetate copolymers.

The sand material should be of a fairly coarse particle size, such as about 25–30 AFS and preferably should have a sharp grain configuration, although a regular shape would not be totally inoperable and the latter would facilitate convenient blowing through intricate crevices of the core cavity. The particulate material should be of a ceramic chemistry such as silica sand and must be unbonded and/or freeflowing.

Figure 4:
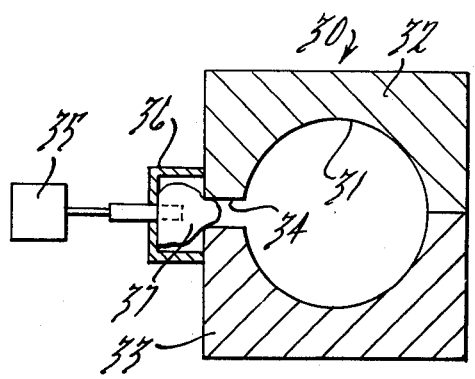
FIGS. 4–6 are schematic illustrations of the essential steps of alternative method for carrying out the invention.
Figure 5:
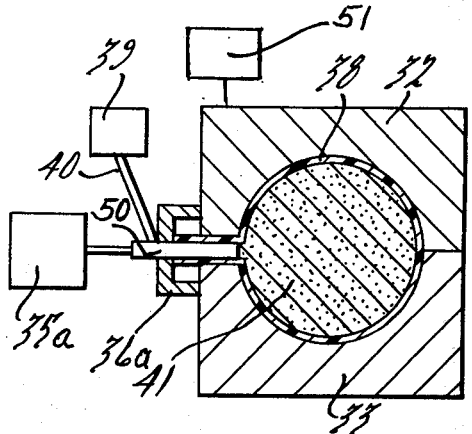
Figure 6:
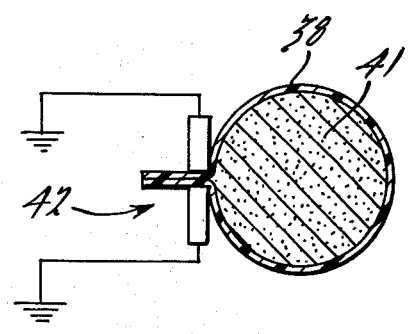

An alternative method sequence is illustrated in FIGS. 4–6. As shown in FIG. 4, the core box 30 may be provided with any type of cavity configuration 31, here preferably shown as a typical sphere, the upper and lower portions 32 and 33 mated together to complete the cavity definition. An entrance passage 34 is provided for introduction of the particulate material to form the base core. A blowing mechanism 35 has a cup-shapped nozzle 36 which is placed in position adjacent the passage 34 to said cavity. The cup-shape configuration is effective to close off the cavity while permitting the stationing of a deposit 37 of blowable, expandable plastic material at the head of passage nozzle to form the plastic envelope. As shown in FIG. 5, sufficient pressure (typically a positive pressure of about 3–4 p.s.i.) is applied from the mechanism 35 through the nozzle 36 to force the viscous plastic material to enlarge and layer against the inner surface of the core box cavity 31 at a predetermined thickness. In effect, this constitutes blowing a shell 38 or parision of consumable plastic material; the forces required must be of a nature so as to distribute the plastic material, which is of a relatively viscous nature, about such cavity. When the plastic medium has been sufficiently distributed to form the shell under such pressure, the mechanism 35 is replaced by a vacuum-injector assembly having a similar nozzle 36a, see FIG. 5. A supply of unbonded sand from means 39 is injected, as by a slinger 50 or by gravity. The sand is imparted through passage 40 into the nozzle 36 and mechanically forced to fill the shell 38 while the core box is vibrated by means 51. Such vibration and filling is continued until a specific density and suitable green strength forms the base core 41.

After complete sand filling, preferably with a sharply grained sand, the mechanism 39 is deactivated and a vacuum means 35a is activated to draw a vacuum through nozzle 36a.

In FIG. 6, the nozzle 36a and vacuum mechanism 35a is removed and immediately a suitable plastic sealing mechanism 42 is arranged to close and seal the mouth of the blown plastic wrapper by fusion; it may be preferable that the envelope be drawn by a vacuum while undergoing sealing.

The thickness of the intended wrapper provided by the envelope method has a uniform ply of material. In the alternative method where the body of plastic material is exploded or blown by air to form a shell in the cavity, the thickness is predominantly uniform. In each case the envelope thickness must be taken into consideration when designing the core size, since the wrapper itself will be consumed by the molten metal and displaced thereby; the core box must have a cavity slightly larger than the intended core to facilitate occupancy by the wrapper therearound.

I claim:

1. A method of casting an object requiring cored inserts:
   a. prepare core box elements having walls for defining a core cavity with an opening at one location,
   b. insert a consumable impermeable thin ply of continuous material onto and throughout said cavity walls in a manner to conform identically to the contours of said cavity walls and form an enclosed shape,
   c. inject ceramic particulate material through said opening into the interior of said impermeable thin ply shape, continue said injection in sufficient quantity to form a material shape which occupies the entire cavity space except for the ply of material separating said cavity walls from said particulate material,
   d. while drawing a vacuum on said continuous material shape sufficient to draw the continuous material intimately about the sand shape, permanently close said continuous material at said opening through which said sand is inserted so that the particulate material will not deviate from the intended outer contour of said core, said assembly forming a tight durable self-supporting wrapped core with the consumable continuous material forming the outer skin thereof,
   e. place said wrapped core shape into a porous molding cavity and introduce molten metal to displace said consumable continuous material and define a casting thereabout, and
   f. subsequent to definition of the casting, disintegrate said particulate material by impact strip from the interior of said casting.

2. The method of casting as in claim 1, in which the ceramic particulate material is mechanically slung into said cavity with a force sufficient to define a core body having a green strength of at least 400 p.s.i.

3. The method as in claim 2, in which said sand slinging is carried out while said core box elements are vibrated.

4. A method of casting as in claim 1, in which the particulate material has a particle size of about 25–30 AFS.

5. The method as in claim 1, in which vibration is applied to said core box elements while said particulate material is injected.

6. The method of casting as in claim 1, in which said thin ply of continuous material is selected from thermoforming grades of polyethylene or ethylene vinyl acetate copolymers.

7. The method as in claim 1, in which a vacuum is imposed on said continuous material to intimately adhere to the particulate material either during or immediately prior to closing said continuous material at said opening.

8. A method of casting as in claim 1, in which a deposit of said continuous material is placed adjacent the entrance to said core box cavity and blown into the cavity thereof to form a thin shell parision.

* * * * *